United States Patent [19]

Seps

[11] 4,092,030
[45] May 30, 1978

[54] AN APPARATUS USING A PIVOTED WEIGHT MECHANISM FOR LIFTING THE TONE ARM OF A RECORD PLAYER

[76] Inventor: Daniel Seps, SeeStrasse 336, 8038 Zurich, Switzerland

[21] Appl. No.: 801,553

[22] Filed: May 31, 1977

[30] Foreign Application Priority Data

Jun. 1, 1976 Switzerland .......................... 6837/76

[51] Int. Cl.² .............................................. G11B 3/10
[52] U.S. Cl. .................................... 274/1 R; 274/23 B
[58] Field of Search ..................... 274/1 R, 1 L, 23 A, 274/23 B

[56] References Cited

U.S. PATENT DOCUMENTS

| 2,947,542 | 8/1960 | Grunwald | 274/1 R |
| 3,129,946 | 4/1964 | Rabinow | 274/23 A |

Primary Examiner—Steven L. Stephan
Attorney, Agent, or Firm—Darbo & Vandenburgh

[57] ABSTRACT

An arm is pivotally mounted on a support and movable between a first position at which it is relatively unstable because its center of gravity is above and close to the pivot point and a second position at which it is relatively stable because its center of gravity is well below the pivot point. The lever is mounted so that when in the first position a part thereof is in the path of the movement of the tone arm. As the tone arm contacts that part, it pushes the lever so as to displace the center of gravity across center. Thereafter, as the center of gravity descends the arm picks up the tone arm and holds it against a part of the support. In one embodiment a weight is fixed on an end of the lever. In other embodiments the weight is movable along the length of the lever, with the weight being a solid or a liquid.

10 Claims, 6 Drawing Figures

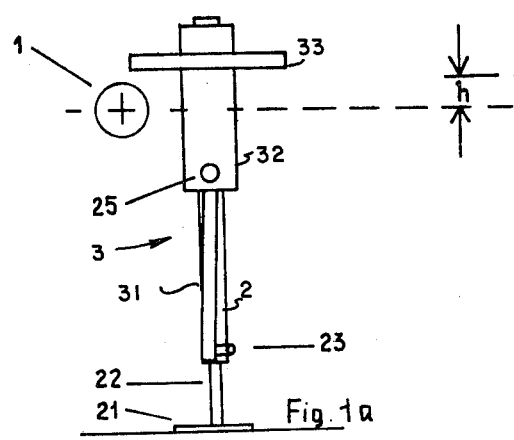
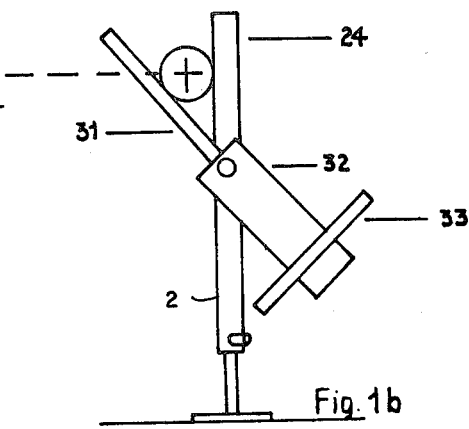
Fig. 1a     Fig. 1b
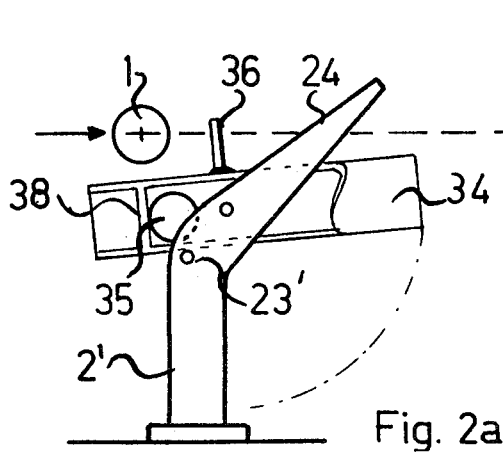
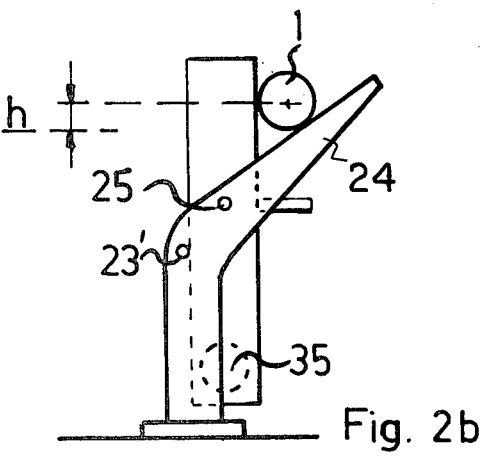
Fig. 2a     Fig. 2b
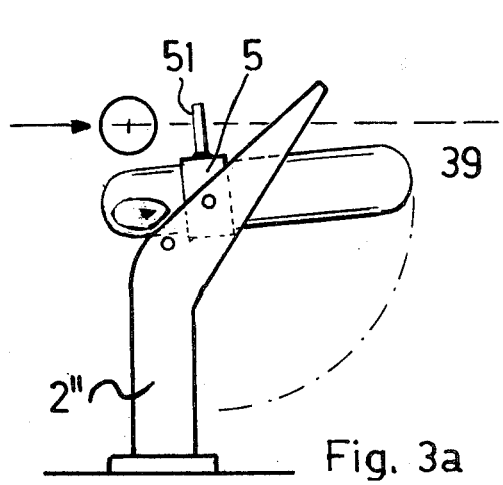
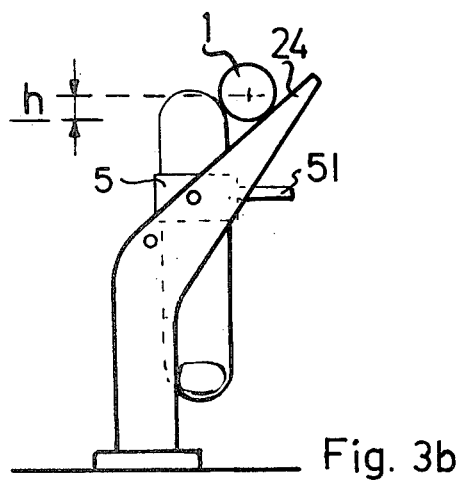
Fig. 3a     Fig. 3b

AN APPARATUS USING A PIVOTED WEIGHT MECHANISM FOR LIFTING THE TONE ARM OF A RECORD PLAYER

Record players, in particular those in the higher price range, possess an arrangement for the lifting of the tone arm from the record after this has finished playing.

The invention layed out here concerns a new procedure for the lifting of the tone arm of a record player and an arrangement for carrying out this procedure. The aim of this invention is to find a procedure which makes possible, to lift the tone arm from the record using only a simple arrangement of mechanical components. With the aid of this invention, this aim has been achieved by using an apparatus which distinguishes itself by placing a balancing arrangement with an unequal distribution of weight in the way of the tone arm. Before playing a record this arrangement is brought into an unstable balance. When the tone arm reaches the end of the record it touches the balancing arrangement causing the center of gravity to move across center which tips the arrangement into a stable position thereby lifting the tone arm and keeping it in an upper position by pressing it against the arm of the central support pillar.

The invention refers to an arrangement for executing this procedure which distinguishes itself by a central support pillar with a fixed upright pointing arm and holding a balancing arrangement with an unequal distribution of weight on a pivot, the balancing arrangement being held in position by a stop on the central support pillar which is placed in the way of the tone arm.

DESCRIPTION OF THE DRAWINGS

Thus shown:

FIG. 1a and b: An arrangement with a rigid balancing weight turning on a pivot at both end positions.

FIG. 2a and b: An arrangement with a free moving balancing weight in a balancing arrangement on a pivot, at both end positions; and FIG. 3a and b: An arrangement with a free flowing balancing weight in a balancing arrangement on a pivot, at both end positions.

In the drawings, the main constant parts are always labelled the same. These are: In the described section tone arm 1, and the central support pillar 2, and the balancing arrangement generally 3.

The procedure can be easily described according to FIG. 1a and b. During the playing of the record the tone arm, laying on the record, moves to the center of the record. Before playing a record the lifting arrangement is brought into the unstable balancing position as shown in FIG. 1a. The lever arm 31 lies against the screw 23. The other part of the balancing arrangement 3 which is a rigid counter weight 32. When the lever arm 31 is against screw 23, the weight 32 above the pivot and close to dead-center, a relatively unstable position. After the last recorded groove has been played the tone arm moves quickly and before it reaches the closed end groove it touches the balance weight 32 above the pivot. Only a very small force is needed to move the balance weight past dead-center. In less than a second the balance weight tips over into the stable end position, as shown in FIG. 1b, thereby lifting the tone arm by a distance h and keeping it in an upright position by pressing it against the upright arm 24 of the central support pillar 2.

Such a simple lifting device can be easily fitted by any layman, e.g. by means of glueing on any record player between the turn-table platter and the pivot of the tone arm, at any time.

The represented procedure for the lifting of the tone arm presents one of the many possibilities for the execution of the procedure.

There will be three basic types discussed and shown in the drawings

In FIG. 1 an arrangement is shown with a rigid counter balance weight. The central support pillar 2 has a base 21 mounted by a double faced adhesive tape. To adjust to the proper height the base can be fixed with a screw 23 which holds the rod 22 of the base in pillar 2. The balancing arrangement consists of a counter weight 32 and a lever arm 31 pivotally mounted on a pivot 25. The stop is represented by screw 23. The lifting height is a function of the mass of the counter weight, the pickup stylus force in the groove and the placement of the central support pillar on the turntable. For high force on the pick up stylus the mass counter weight can be increased for the right lifting height by an additional weight 33. Contrary to the two further types of arrangements this arrangement shows as in FIG. 1a and 1b a tipping movement of about 180°, whereas the others represent a movement of about 90°.

In FIGS. 2a and 2b the balancing arrangement comprises a closed or closable tube 34 with a balancing weight comprising a freely moving ball 35 inside the tube, the tube forming a track for the ball. Fixed on the tube 34 is a catch 36. The tube 34 is pivotally mounted on a support pillar 2'. In the unstable position of the balance weight (FIG. 2a) the tube 34 lies on the stop 23' of the central support pillar 2' and the ball rests against the closed end 38 of the tube. When the tone arm 1 moves against the catch 36 the tube moves sufficiently to cause the ball to roll over the dead-center position and the tube tips over the pivot 25 into the stable position (FIG. 2b), thereby lifting the tone arm and keeping it in an upright position by pressing it against the upright arm 24 of the central support pillar.

The last arrangement illustrated (FIGS. 3a and 3b) uses a liquid (in the example shown mercury) as a balancing weight. It includes an ampule or elongated container 39 held by a support 5 and in which mercury or other liquid is received. The support is pivotally mounted on a support pillar 2''. When the tone arm touches the catch 51 on the support 5 the inclination of the container changes and the liquid begins to flow to the other end of the container. This changes the balance and the balancing arrangement tips into the stable end position (FIG. 3b) thereby lifting the tone arm and keeping it in an upright position by pressing it against the arm 24 of the central support pillar.

Should another liquid be used, it is recommended that the container 39 have a flow obstruction at the pivot point.

The described arrangements are only three of many possibilities.

If, for example, a rail turning on a pivot as a balancing arrangement, a solution with a sliding mass could be realized.

An especially interesting solution is a groove with a ball, the groove having a slight inclination. During the playing, the tone arm is pushing the ball upwards in the groove till the ball reaches the dead-center, tipping over to the end position. If the inclination has been correctly selected the pushing force of the tone arm corresponds to the antiskatingforce.

I claim:

1. An apparatus for lifting the tone arm of a record player which tone arm moves along a path in a given direction at the time when the tone arm is to be lifted, said apparatus comprising:

a support;

balancing means mounted on said support for an across-center movement of its center of gravity from a first position to a second position, in said first position said center of gravity being relatively close to and above center so as to require minimal force in a specific direction to move said balancing means across center, in said second position said center of gravity being remote from and below center so as to be a relatively stable position, said balancing means being in said first position and having a portion positioned in said path and with said specific direction substantially coincident with said given direction so that upon said movement of the tone arm in said given direction, said tone arm engages and moves the balancing means across center; and means comprising, at least in part, a part of said balancing means, for engaging, lifting and supporting said tone arm upon said tone arm so moving into the balancing means and so moving the latter across center.

2. An apparatus as set forth in claim 1, wherein said balancing means includes an elongated member having an intermediate portion pivotally connected to said support, and weight means supported by said elongated member.

3. An apparatus as set forth in claim 2, wherein said member pivots in one direction when moving from said first position to said second position, and wherein said support includes a stop to prevent said member from moving in the reverse of said one direction beyond said first position.

4. An apparatus as set forth in claim 3, wherein a portion of said member to one side of the pivot forms said part of said balancing means.

5. An apparatus as set forth in claim 4, wherein said weight means is affixed to a portion of said member that is opposite to said one side of said pivot.

6. An apparatus as set forth in claim 4, wherein said weight means is a ball, and said member forms a track on which said ball is supported, said track extending to both sides of the pivot.

7. An apparatus as set forth in claim 4, wherein said member includes a container extending to both sides of the pivot, and said weight means is a liquid in said container.

8. An apparatus as set forth in claim 2, wherein said weight means is affixed to a portion of said member that is at one side of said pivot.

9. An apparatus as set forth in claim 2, wherein said weight means is a ball, and said member forms a track on which said ball is supported, said track extending to both sides of the pivot.

10. An apparatus as set forth in claim 2, wherein said member includes a container extending to both sides of the pivot, and said weight means is a liquid in said container.

* * * * *

UNITED STATES PATENT AND TRADEMARK OFFICE
CERTIFICATE OF CORRECTION

PATENT NO. : 4,092,030
DATED : May 30, 1978
INVENTOR(S) : Daniel Seps

It is certified that error appears in the above-identified patent and that said Letters Patent are hereby corrected as shown below:

```
Column 1, after line 3, --BACKGROUND AND SUMMARY OF THE
INVENTION-- should be inserted.
Column 1, line 36, "Thus shown:" should be deleted.
Column 1, line 57, --is-- should be inserted after "32".
Column 2, line 2, a comma should be inserted after "glueing".
Column 2, line 9, a period should be inserted after "drawings".
```

Signed and Sealed this

Thirty-first Day of October 1978

[SEAL]

Attest:

RUTH C. MASON
Attesting Officer

DONALD W. BANNER
Commissioner of Patents and Trademarks